Dec. 13, 1927.

W. E. RIZA

COTTON HARVESTER

Filed April 16, 1926

W. E. Riza Inventor

By C.A.Snow & Co.
Attorneys

Dec. 13, 1927.

W. E. RIZA 1,652,459

COTTON HARVESTER

Filed April 16, 1926  3 Sheets-Sheet 3

W. E. Riza Inventor

By C. A. Snow & Co.
Attorneys

Patented Dec. 13, 1927.

1,652,459

UNITED STATES PATENT OFFICE.

WILL E. RIZA, OF NEMO, TEXAS.

COTTON HARVESTER.

Application filed April 16, 1926. Serial No. 102,480.

This invention relates to cotton harvesters and is designed more especially as an improvement upon the structure disclosed in my co-pending application filed August 13, 1925, Serial No. 50,077.

One of the objects of the invention is to provide a machine which can be drawn along rows of standing plants, there being simple and efficient means for beating the plants so as to separate the cotton bolls therefrom and bring them into the path of an air current which acts to carry the bolls to separating mechanism constituting a part of the machine.

A further object is to improve upon the separating mechanism so as to increase its efficiency by effecting an almost complete separation of the fibers from the trash.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
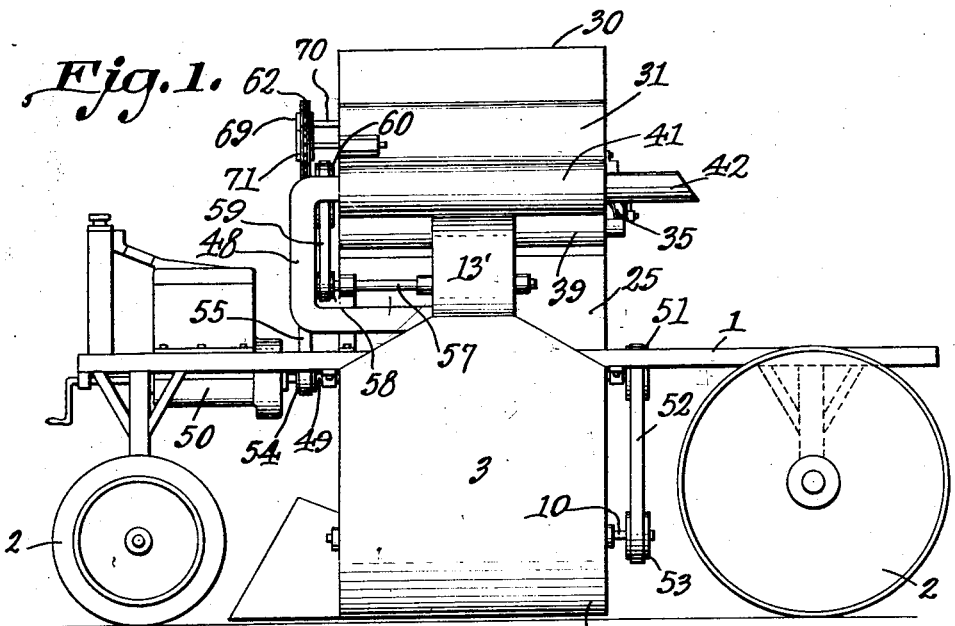
Figure 1 is a side elevation of the machine.
Figure 4:
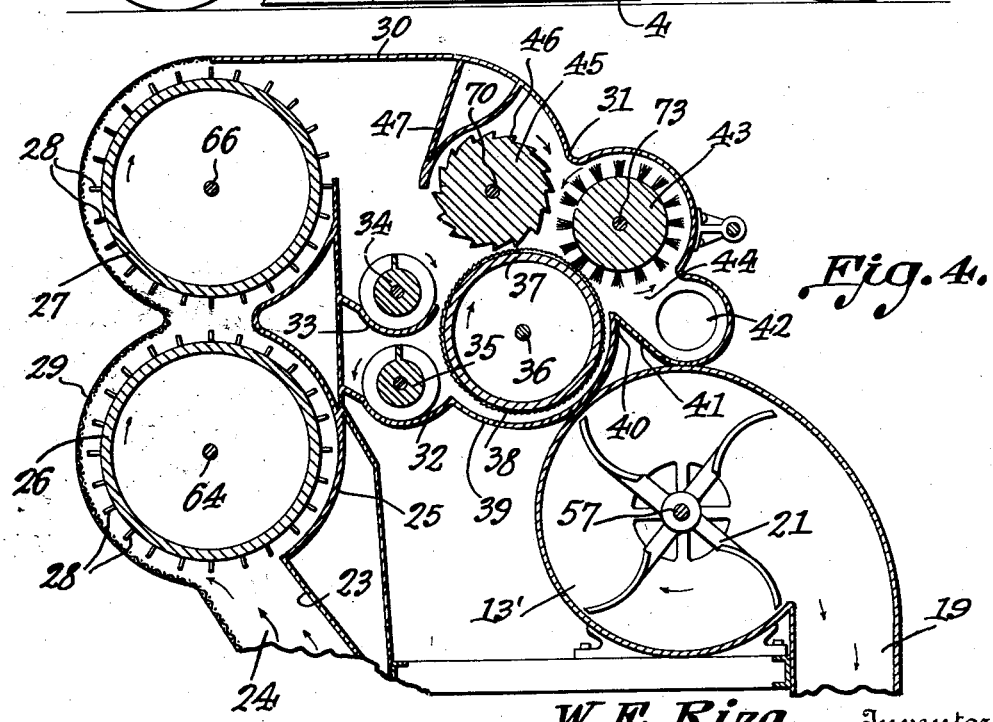
Figure 4 is a vertical transverse section through the separating mechanism.

Referring to the figures by characters of reference 1 designates a vehicle body provided with supporting wheels 2 and this structure is adapted to be propelled by any suitable means provided for that purpose. Suspended from the body is a housing 3 having its bottom portion curved transversely as at 4 so as to present a convex surface extending longitudinally of the housing. A longitudinally extending plant receiving opening 5 is formed in this bottom portion 4 and the ends of the housing are formed with upwardly extending openings 6 registering with the ends of the opening 5. Adjustably mounted upon the ends of the housing 3 and across the openings 6 are cross strips 7 which can be held to the end walls by bolts 8 or the like insertable into openings 9 arranged in parallel series. In these cross strips is journaled a longitudinal shaft 10 provided with oppositely extending crank portions 11 each of which has a blade 12 connected thereto as shown. The advancing face of each blade is rounded or convex as shown at 13 and it will be understood that when shaft 10 is rotated in one direction these blades will be moved successively across the lower portion of housing 3 close to the bottom opening 5.

Figure 2:
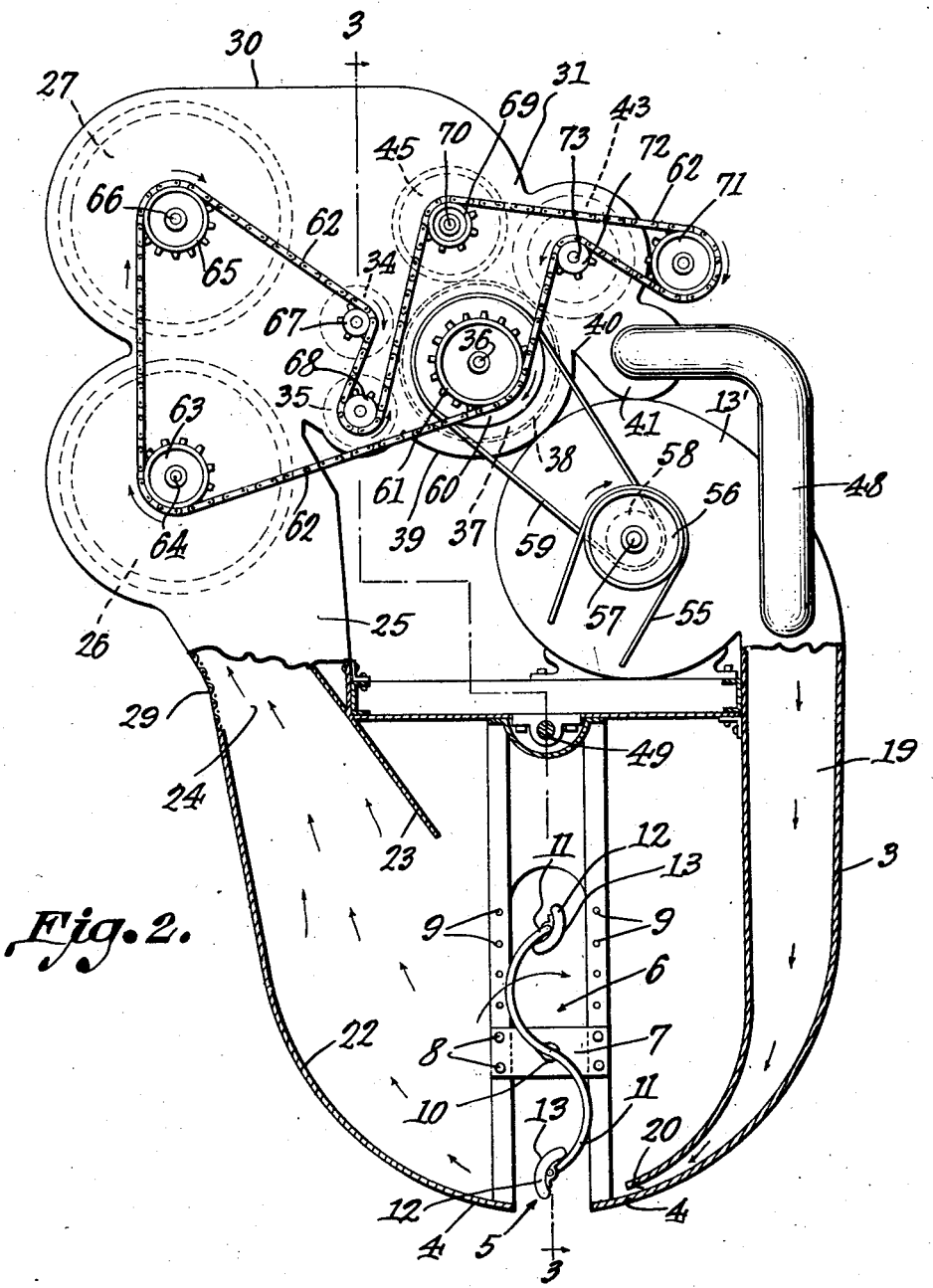
Figure 2 is an enlarged view partly in front elevation and partly in section of the harvesting and separating mechanism.
Figure 3:
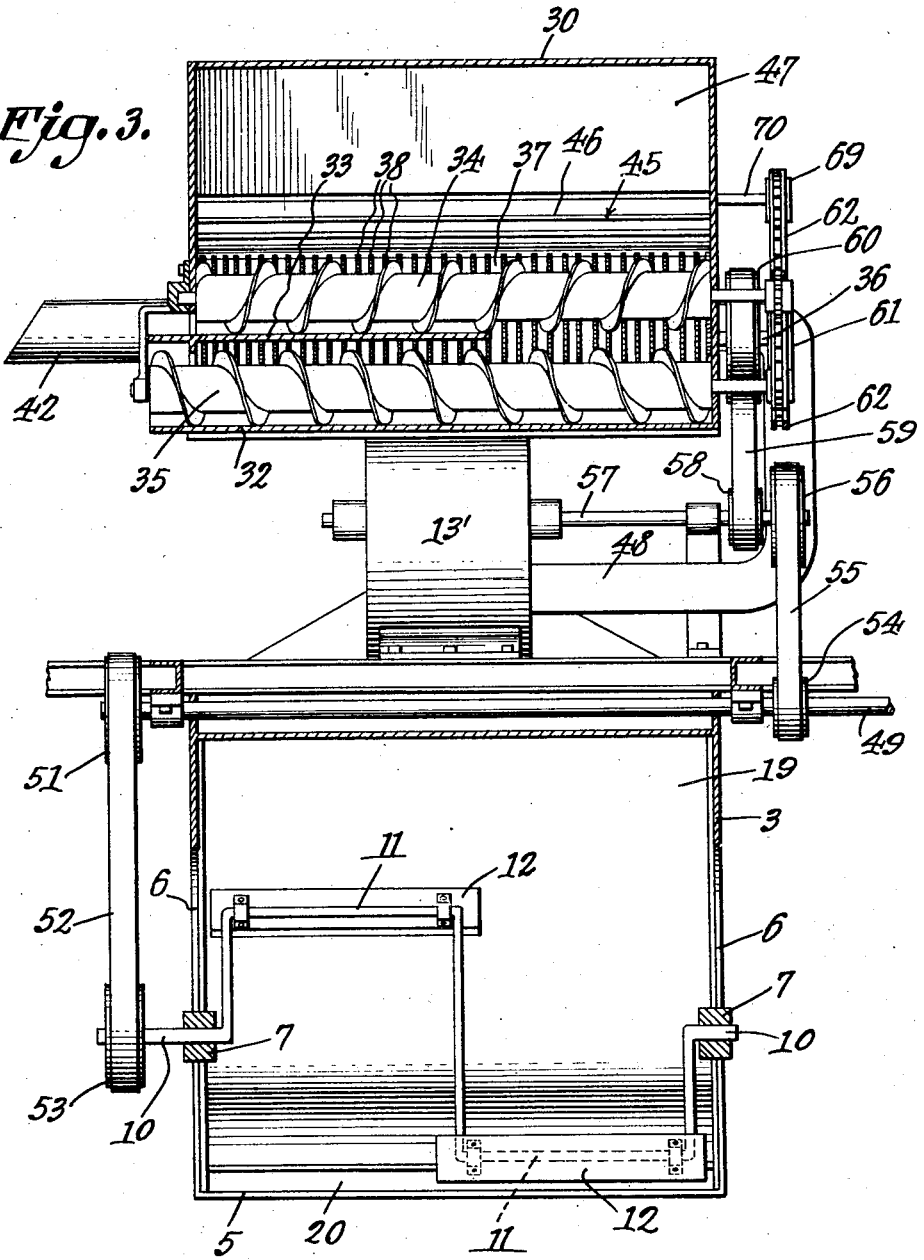
Figure 3 is a section on line 3—3 Figure 2.

Arranged above the housing 3 is a blower casing 13' the outlet of which opens into a downwardly extending flue 19. This flue is built into one side of and extends throughout the length of the housing 3, the transverse of the area of the flue gradually diminishing toward the lower end and the said flue being provided with an outlet 20 extending longitudinally of the housing close to one side of the opening 3. Thus it will be seen that, during the operation of the blower 21 a strong current of air will be directed downwardly within the flue 19 and will be delivered in a thin sheet across the opening 5. This sheet of air delivered under pressure will flow into the opposite side portion of the housing 3 and be deflected upwardly by the curved bottom and side wall 22 as indicated by arrows in Figure 2.

Arranged within the housing 3 adjacent the upwardly extending wall 22 thereof is a deflecting plate 23 extending longitudinally of the housing, this plate and the wall 22 converging upwardly and providing an inlet 24 to the housing 25 of the separating mechanism. In this housing are arranged two superposed cylinders 26 and 27 having radial teeth 28 upon their peripheries. The walls of the housing 25 are concentric with and supported close to the paths of these teeth or spikes, the outer wall of said housing being preferably formed of a foraminous material 29, as shown. The top 30 of the housing 25 is extended laterally beyond the uppermost cylinder 27 and constitutes the top of an extension housing 31. In the lower portion of this extension housing are superposed troughs 32 and 33, there being a worm 34 mounted for rotation in the trough 33 and a worm 35 mounted for rotation in the trough 32. A shaft 36 is journaled in the extension housing 31 and supports a drum 37 on the periphery of which are formed annular series of saw teeth 38. This drum is provided with a concave 39 extending from the lower trough 32 upwardly partly around the drum 36 to a ridge 40 where it merges into a pocket 41 having an outlet opening 42 at the rear end thereof. A rotatable brush 43 is arranged within the extension housing 31 above the ridge 40 so as to extend across the inlet 44 of the pocket 42. This brush is designed to engage the teeth 38 so as to doff fibers therefrom and direct them into the pocket 41. A rotatable beater in the form of a cylinder 45 having peripheral longitudinal ribs 46 is journaled above the drum 37 between the brush 43 and the upper wall 34. A guard plate 47 is extended downwardly from the top 30 and serves to deflect downwardly toward the wall 34 all material thrown off of the upper cylinder 27.

The flue 19 has a branch flue 48 extending from the upper portion thereof and opening into the forward end of the pocket 41. For the purpose of driving the various parts of the separator any suitable mechanism may be utilized. In the structure illustrated a main drive shaft 49 is extended from an engine 50 and has a pulley 51 which transmits motion through a belt 52 to a pulley 53 secured to the shaft 10. Another pulley 54 is secured to the shaft 49 and is adapted to transmit motion through a belt 55 to a pulley 56 secured to the shaft 57 of the blower 21. Another pulley 58 is carried by the shaft 57 and transmits motion through a belt 59 to a pulley 60 secured to the shaft 36. A sprocket 61 can also be secured to this shaft 36 and drives an endless chain 62. This chain engages a sprocket 63 on the shaft 64 of cylinder 26, a sprocket 65 on shaft 66 of cylinder 27, sprockets 67 and 68 connected to and rotatable with the worms 34 and 35, a sprocket 69 secured to the shaft 70 of the beater 45, an idler sprocket 71, and a sprocket 72 secured to the shaft 73 of brush 43.

From the foregoing it will be apparent that during the operation of the machine the various parts will be operated simultaneously in the directions indicated by the arrows and the action will be as follows:

The standing plants will be received within the opening 3 as the machine moves forwardly and the rotating beaters or blades 13 will strike the plants and knock the bolls from them. During this action a strong sheet of air under pressure is being delivered throughout the length of the housing transversely of the opening 5 so that the detached bolls will be caught in the blast and driven laterally and upwardly into the throat or inlet 24 of the separating mechanism. Here the bolls will be successively acted upon by the teeth or spikes on the cylinders 26 and 27, the hulls and trash being dragged over the screen 29 and the small particles being delivered through the screen.

The fibers, however, will be thrown off of the upper cylinder by centrifugal force and come against the guard plate 49 which will deflect them with any trash commingled therewith into the upper trough 33. The worm in this trough will carry the material in the direction indicated by the arrow and against the saw and will tend to draw the material along a line parallel with the axis of rotation of the drum 37. Thus the tearing action will be very efficient because not only will the saws engage and pull upon the fibers but, at the same time, the worm will drag the fibers transversely of the paths of the teeth of the saw. Trash separated from the fibers during this operation will fall into the lower trough 32 and be carried rearwardly by the rotating worm 35. As the fibers are engaged and carried upwardly and laterally by the teeth of the saws 38 they will be acted upon by the rotating beater 45 the ribs of which will strike and work backwardly against the fibers so as to further break up the trash and tend to remove it from the fibers. Thereafter the cleaned fibers will be doffed from the saws by the brush 43 which will throw these fibers into the pocket 41. Here they will come into the line of an air blast being delivered longitudinally of the pocket toward outlets 42 from the small flue 48. Consequently the fibers will be delivered from the machine into any suitable receptacle provided for them.

What is claimed is:

A portable separator including an elevated housing having an inlet in the bottom thereof, there being a foraminous wall extending upwardly from the inlet and providing superposed arcuate portions, superposed separating cylinders within the housing above the inlet and operating to drag material upwardly from the inlet along said foraminous wall, a drum mounted for rotation within the housing and having annular series of saw teeth, superposed troughs supported adjacent the drum, the upper trough constituting means for receiving cotton delivered from the upper separating cylinder, a worm rotatably mounted above said trough for dragging cotton along the trough and the toothed surface of the drum and delivering it to the lower trough, a worm within the lower trough for delivering trash from one end thereof, there being a cotton outlet in the housing, means interposed between the drum and the outlet for beating and doffing cotton engaged by the drum, and means adjacent the outlet for setting up a downward blast of air within one side of the housing and an upward blast through the inlet of the housing.

In testimony that I claim the foregoing as my own, I have hereto affixed my signature.

WILL E. RIZA.